(12) United States Patent
Choi

(10) Patent No.: US 8,619,004 B2
(45) Date of Patent: Dec. 31, 2013

(54) MOBILE TERMINAL USING TOUCH SCREEN AND METHOD OF CONTROLLING THE SAME

(75) Inventor: Hyun Bo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1325 days.

(21) Appl. No.: 12/183,043

(22) Filed: Jul. 30, 2008

(65) Prior Publication Data

US 2010/0110010 A1    May 6, 2010

Related U.S. Application Data

(60) Provisional application No. 60/952,658, filed on Jul. 30, 2007.

(51) Int. Cl.
*G09G 5/00*    (2006.01)

(52) U.S. Cl.
USPC .......................................................... 345/1.3

(58) Field of Classification Search
USPC .................................... 345/1.1–3.1, 173–178
See application file for complete search history.

(56) References Cited

U.S. PATENT DOCUMENTS

| | | | |
|---|---|---|---|
| 6,430,405 B1 * | 8/2002 | Jambhekar et al. | 455/403 |
| 7,639,237 B2 * | 12/2009 | Perkins | 345/168 |
| 7,672,700 B2 * | 3/2010 | Oda | 455/575.4 |
| 8,106,887 B2 * | 1/2012 | Park et al. | 345/169 |
| 2005/0062758 A1 | 3/2005 | Kaasila et al. | |
| 2005/0083642 A1 | 4/2005 | Senpuku et al. | |
| 2005/0091431 A1 | 4/2005 | Olodort et al. | |
| 2005/0096082 A1 | 5/2005 | Chang | |
| 2007/0287515 A1 | 12/2007 | Fagrenius et al. | |

FOREIGN PATENT DOCUMENTS

| | | |
|---|---|---|
| EP | 1811750 | 7/2007 |
| WO | 01/28194 | 4/2001 |

* cited by examiner

*Primary Examiner* — Bipin Shalwala
*Assistant Examiner* — Steven Holton
(74) *Attorney, Agent, or Firm* — Lee, Hong, Degerman, Kang & Waimey

(57) ABSTRACT

The present invention relates to a mobile terminal and a method of controlling the same. The mobile terminal of the present invention includes a first body equipped with a first display unit and a user input unit, a second body equipped with a second display unit and coupled to the first body in a sliding manner, and a controller that controls at least one of display of an image and display of a control menu with respect to at least one of the first and second display units according to a distance where the second body slides from a position where the second body has slid down to the first body. According to the present invention, at least one of display of an image and display of a control menu can be controlled in response to a distance where the second body slides.

20 Claims, 15 Drawing Sheets

MOBILE TERMINAL USING TOUCH SCREEN AND METHOD OF CONTROLLING THE SAME

CROSS-REFERENCE TO RELATED APPLICATIONS

This application claims the benefit of U.S. Provisional Application Ser. No. 60/952,658 filed on Jul. 30, 2007.

BACKGROUND OF THE INVENTION

1. Field of the Invention

The present invention relates to a mobile terminal and a method of controlling the some and, more particularly, to a mobile terminal whose operation can be controlled using a general keypad and a touch screen and a method of controlling the same.

2. Description of the Related Art

Recently, touch screen devices are becoming more popular. However, even though a consumer's perception of a touch screen device has improved, many consumers are still reluctant to buy a mobile phone with a touch screen for various reasons. For example, the touch screen of the mobile phone is vulnerable to breakage, dust, smudges, and uses more power to drive the touch screen. Therefore, in a mobile terminal with a touch screen, it is preferable to hide the large touch screen and power it when the touch screen is activated by, for example, sliding it open with respect to the upper casing.

Also, a touch screen, by its design, has no feedback for a user to determine whether a key is depressed. In general, conventional tactile keys on a mobile terminal provide such feed back with either a clicking sound or detectable movement of the keys. Thus, many users prefer to have a tactile keypad when making phone calls.

Also, although mobile phones with only a touch screen have flexibility when programming the screen to do different things, making a simple phone call may require additional steps, such as activating the touch screen to enter the phone mode.

SUMMARY OF THE INVENTION

It is, therefore, an object of the present invention to provide a mobile terminal in which various operations, which can be hidden or protected when not being used, can be controlled using a touch screen and a general keypad, and a method of controlling the same.

In accordance with an embodiment of the present invention, there is provided a mobile terminal, including a first body equipped with a first display unit and a user input unit, a second body equipped with a second display unit and coupled to the first body in a sliding manner, and a controller that controls at least one of display of an image and display of a control menu with respect to at least one of the first and second display units according to a distance where the second body slides from a position where the second body has slid down to the first body.

In accordance with another embodiment of the present invention, there is provided a method of controlling a mobile terminal, including a first body equipped with a first display unit and a user input unit, and a second body equipped with a second display unit and coupled to the first body in a sliding manner, including the steps of allowing the second body to move from a first position where the second body has slid down to the first body to a second position where the second body slides up from the first body, and controlling at least one of display of an image and display of a control menu with respect to at least one of the first and second display units according to a distance where the second body slides from the first position.

In accordance with further another embodiment of the present invention, there is provided a mobile terminal, including a first body equipped with a first display unit and a user input unit, a second body equipped with a touch screen and coupled to the first body in a sliding manner, and a controller for displaying a text entry window, which is selected in response to a distance where the second body slides from a position where the second body has slid down to the first body, on the touch screen.

In accordance with still another embodiment of the present invention, there is provided a method of controlling a mobile terminal, including a first body equipped with a display unit and a user input unit, and a second body equipped with a touch screen and coupled to the first body in a sliding manner, including the steps of allowing the second body to move from a first position where the second body has slid down to the first body to a second position where the second body has slid up from the first body, and displaying an entry window, which is selected in response to a distance where the second body slides from the first position, on the touch screen.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Hereinafter, embodiments of the present invention will be described in detail with reference to the accompanying drawings so that they can be readily implemented by those skilled in the art.

It is to be understood that a mobile terminal described in this specification can include mobile phones, smart phones, notebook computers, terminals for digital broadcasting, personal digital assistants (PDAs), portable multimedia players (PMPs), navigation devices and so on. It is also to be noted that the suffix of constituent elements used in the following description, such as "module" and "unit", is simply assigned by considering the easiness of writing this specification, but is not specifically assigned by considering the importance and roles. Accordingly, the "module" and "unit" can be mixed in use.

Figure 1:
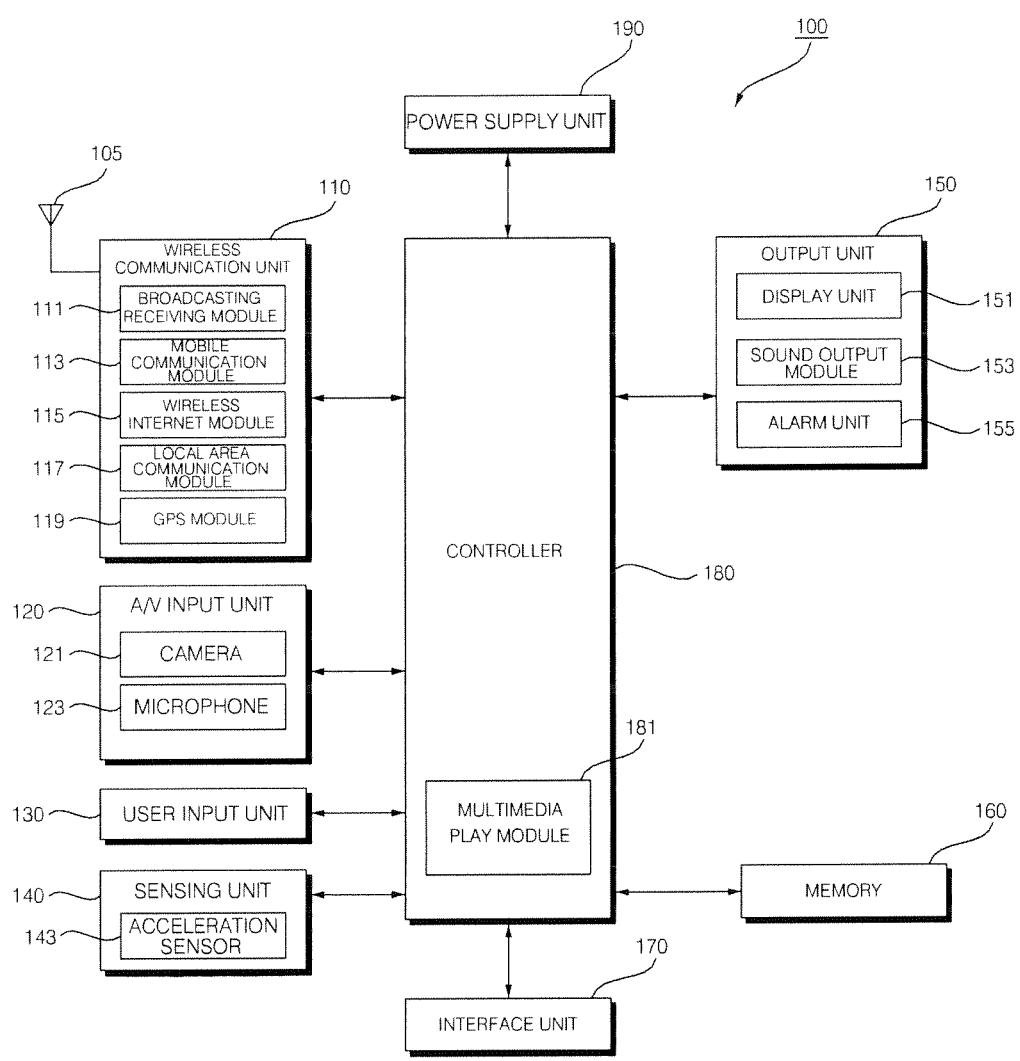
FIG. 1 is a block diagram of a mobile terminal in accordance with an embodiment of the present invention.

FIG. 1 is a block diagram of a mobile terminal in accordance with an embodiment of the present invention. The mobile terminal according to an embodiment of the present invention is described below with reference to FIG. 1 from a standpoint of the constituent elements according to their functions.

Referring to FIG. 1, the mobile terminal 100 can include a wireless communication unit 110, an audio/video (A/V) input unit 120, a user input unit 130, a sensing unit 140, an output unit 150, memory 160, an interface unit 170, a controller 180, and a power supply unit 190. When the constituent elements are implemented in actual applications, two or more of the constituent elements can be combined into one constituent element or one of the constituent elements can be divided into two or more constituent elements, appropriate.

The wireless communication unit 110 can include a broadcasting receiving module 111, a mobile communication module 113, a wireless Internet module 115, a local area communication module 117, a global positioning system (GPS) module 119 and so on.

The broadcasting receiving module 111 receives at least one of broadcasting signals and broadcasting-related information from an external broadcasting management server through broadcasting channels. The broadcasting channels can include a satellite channel, a terrestrial wave channel and the like. The broadcasting management server can be a server for generating and transmitting at least one of broadcasting signals and broadcasting-related information or a server for receiving at least one of previously generated broadcasting signals and previously generated broadcasting-related information and transmitting it to a terminal.

The broadcasting-related information can be information, which is related to a broadcasting channel, a broadcasting program and/or a broadcasting service provider. The broadcasting signals can include not only TV broadcasting signals, radio broadcasting signals, and data broadcasting signals, but also broadcasting signals in which TV broadcasting signals or radio broadcasting signals are combined with data broadcasting signals. The broadcasting-related information can be provided over a mobile communication network. Hence, the mobile communication module 113 can receive the broadcasting-related information. The broadcasting-related information may exist in various fashions. For example, the broadcasting-related information can exist in the form of the electronic program guide (EPG) of the digital multimedia broadcasting (DMB), the electronic service guide (ESG) of the digital video broadcast-handheld (DVB-H) or the like.

The broadcasting receiving module 111 receives broadcasting signals using various broadcasting systems. In particular, the broadcasting receiving module 111 can receive broadcasting signals using a digital broadcasting system, such as the digital multimedia broadcasting-terrestrial (DMB-T), the digital multimedia broadcasting-satellite (DMB-S), the media forward link only (MediaFLO), the digital video broadcast-handheld (DVB-H), and the integrated services digital broadcast-terrestrial (ISDB-T). The broadcasting receiving module 111 can be configured to be suitable for not only digital broadcasting systems, but also all broadcasting systems that provide broadcasting signals. Broadcasting signals and/or broadcasting-related information, which are received through the broadcasting receiving module 111, can be stored in the memory 160.

The mobile communication module 113 transmits/receives radio signals to/from at least one of a base station, an external terminal, and a server over a mobile communication network. Here, the radio signals can include voice call signals, video call signals, or various forms of data according to transmission/reception of text/multimedia messages.

The wireless Internet module 115 refers to a module for wireless Internet access. The wireless Internet module 115 can be embedded in the mobile terminal 100 or external to the mobile terminal 100. The wireless Internet technology can employ WLAN (wireless LAN) (Wi-Fi), Wibro (Wireless Broadband), Wimax (World Interoperability for Microwave Access), HSDPA (High Speed Downlink Packet Access) and so on.

The local area communication module 117 refers to a module for local area communication. Local area communication technologies can employ Bluetooth, radio frequency identification (RFID), infrared data association (IrDA), ultra wideband (UWB), ZigBee or the like.

The GPS module 119 receives position information from a plurality of GPS satellites.

The A/V input unit 120 is adapted to input audio signals or video signals and can include a camera 121, a microphone 123 and/or the like. The camera 121 processes image frames, such as still images or motion images, which are captured by an image sensor in a video call mode or a capturing mode. The processed image frames can be displayed on a display unit 151.

The image frames processed by the camera 121 can be stored in the memory 160 or transmitted to the outside through the wireless communication unit 110. The camera 121 can be provided in plural numbers according to the configuration of a terminal.

The microphone 123 receives external sound signals in a call mode, a recording mode, a voice recognition mode and so on and converts the received sound signals into electrical voice data. In the call mode, the processed voice data can be converted into a format, which can be transmitted to a mobile communication base station through the mobile communication module 113, and then output. The microphone 123 can employ a variety of noise removal algorithms for removing noise generated while external sound signals are received.

The user input unit 130 generates key entry data, which is input by a user in order to control the operation of a terminal. The user input unit 130 can include a keypad, a dome switch, a touch pad (static pressure/constant electricity), a jog wheel, a jog switch, a finger mouse or the like. In particular, a mutual layer structure of the touch pad and the display unit 151, which will be described later on, can be referred to as a touch screen.

The sensing unit 140 senses a current status of the mobile terminal 100, such as the closed configuration of the mobile terminal 100, the position of the mobile terminal 100, and whether a user has touched the mobile terminal 100 or not, and generates a sensing signal to control the operation of the mobile terminal 100. For example, when the mobile terminal 100 is a slide phone type, the sensing unit 140 can sense whether the slide phone is opened or closed. The sensing unit 140 can also have the functions of sensing whether the power supply unit 190 supplies power or not, whether the interface unit 170 is connected to an external device and so on.

The sensing unit 140 can include a proximity sensor. The proximity sensor can detect an approaching object, whether objects exist nearby, etc. without mechanical contact. The proximity sensor can detect neighboring objects by employing a change of AC magnetic field, a change of static magnetic field, the rate of capacitance or the like. Two or more proximity sensors may be used according to the aspect of a configuration.

The sensing unit 140 can include an acceleration sensor 143. The acceleration sensor 143 is an element for converting a change of acceleration in any one direction into an electrical signal and has been widely used in line with the developments of the micro-electromechanical systems (MEMS) technology. The acceleration sensor 143 can include various kinds of sensors, ranging from a sensor, which is embedded in the vehicle's airbag system and used to measure a high acceleration value in order to sense collision, to a sensor, which is used as input means such as in game by recognizing minute operations of the human hands and used to measure a low acceleration value.

The output unit 150 is constructed to output audio signals, video signals or alarm signals. The output unit 150 can include the display unit 151, a sound output module 153, an alarm unit 155 and/or so on.

The display unit 151 displays information processed in the mobile terminal 100. For example, when the mobile terminal is in the call mode, the display unit 151 can display a user interface (UI) or a graphic user interface (GUI), which is pertinent to a call. When the mobile terminal 100 is in the video call mode or the capturing mode, the display unit 151 can display captured or received images individually or at the same time and also display a UI or a GUI.

Meanwhile, in the case in which the display unit 151 and the touch pad form the mutual layer structure to thereby construct a touch screen as described above, the display unit 151 can also be used as an input device as well as an output device.

In the case in which the display unit 151 is constructed of a touch screen, it can include a touch screen panel, a touch screen panel controller and so on. In this case, the touch screen panel is a transparent panel attached to the outside and can be connected to an internal bus of the mobile terminal 100. The touch screen panel continues to monitor whether there is a touch input and, when there is a touch input, sends corresponding signals to the touch screen panel controller. The touch screen panel controller processes the corresponding signals and transmits corresponding data to the controller 180, so that the controller 180 can determine whether there has been a touch input or which area of the touch screen has been touched.

The display unit 151 can include at least one of a liquid crystal display, a thin film transistor-liquid crystal display, an organic light-emitting diode, a flexible display and a 3D display. Two or more display units 151 can be used according to an implementation form of the mobile terminal 100. For example, the mobile terminal 100 may be equipped with both an external display unit (not shown) and an internal display unit (not shown).

The sound output module 153 outputs audio data, which is received from the wireless communication unit 110 in an incoming call mode, a call mode, a recording mode, a voice recognition mode, a broadcasting receiving mode and so on or stored in the memory 160. The sound output module 153 also outputs sound signals, which are related to functions performed in the mobile terminal 100, such as sound of an incoming call signal and sound of an incoming message. The sound output module 153 can include a speaker, a buzzer or the like.

The alarm unit 155 outputs signals to inform events occurring in the mobile terminal 100. For example, the events occurring in the mobile terminal 100 can include an incoming call signal, a received message, a key enter signal and so on. The alarm unit 155 can also output signals to inform the occurrence of events in different ways other than audio signals or video signals. For example, the alarm unit 155 can output the signals through vibration. When a call signal is received or a message is received, the alarm unit 155 can generate a signal so as to inform the reception of the call signal or message. Alternatively, when a key signal is input, the alarm unit 155 can output a signal as a feedback to the key enter signal. A user can notice the occurrence of an event through the signal output from the alarm unit 155. It is to be understood that the signals to inform events occurring in the mobile terminal 100 can also be output through the display unit 151 or the sound output module 153.

The memory 160 can store programs necessary for the process and control of the controller 180 and also function to temporarily store input or output data (for example, a phonebook, messages, still images, motion images, etc).

The memory 160 can include at least one type of storage media, including a flash memory type, a hard disk type, a multimedia card micro type, card type memory (for example, SD memory, XD memory and so on), RAM, and ROM. The mobile terminal 100 may also manage a web storage that performs the storage function of the memory 160 on an Internet.

The interface unit 170 functions as an interface with all external devices connected to the mobile terminal 100. Examples of the external devices connected to the mobile terminal 100 can include a wired/wireless headset, an external charger, wired/wireless data ports, memory cards, card sockets such as subscriber identification module (SIM)/user identity module (UIM) cards, audio input/output (I/O) terminals, video I/O terminals, an earphone and so on. The interface unit 170 can receive data or be supplied with power from the external devices, transfer the data or power to the respective constituent elements of the mobile terminal 100, and transmit data of the mobile terminal 100 to the external devices.

The interface unit 170 can become a passage in which power source from external cradles is supplied to the mobile terminal 100 when the mobile terminal 100 is coupled to the cradles or a passage in which a variety of command signals input from cradles by a user are transferred to the mobile terminal 100.

The controller 180 typically controls an operation of each of the elements and controls an overall operation of the mobile terminal 100. For example, the controller 180 can perform pertinent controls and processes for voice call, data communication, video telephony and so on. The controller 180 may be equipped with a multimedia play module 181 for playing multimedia. The multimedia play module 181 may be constructed in hardware within the controller 180 or constructed in software separately from the controller 180.

The power supply unit 190 is supplied with external power source or internal power source and supplies power source necessary for an operation of the each constituent element under the control of the controller 180.

The mobile terminal 100 constructed as above can include wired/wireless communication systems and a satellite-based communication system and can be constructed to be operable in a communication system that can transmit data through frames or packets.

The mobile terminal pertinent to the present invention has been described so far from a viewpoint of the constituent elements according to its function. Hereinafter, the mobile terminal related to the present invention is further described from a standpoint of the constituent elements according to its external shape with reference to FIGS. 2 and 3. A sliding type mobile terminal equipped with a touch screen of several types of mobile terminals such as a folding type, a bar type, a swing type, and a sliding type, is described below as an example, for convenience of description. However, it is to be understood that the present invention is not limited to the sliding type mobile terminal, but instead can be applied to all types of mobile terminals, including the above types.

Figure 2:
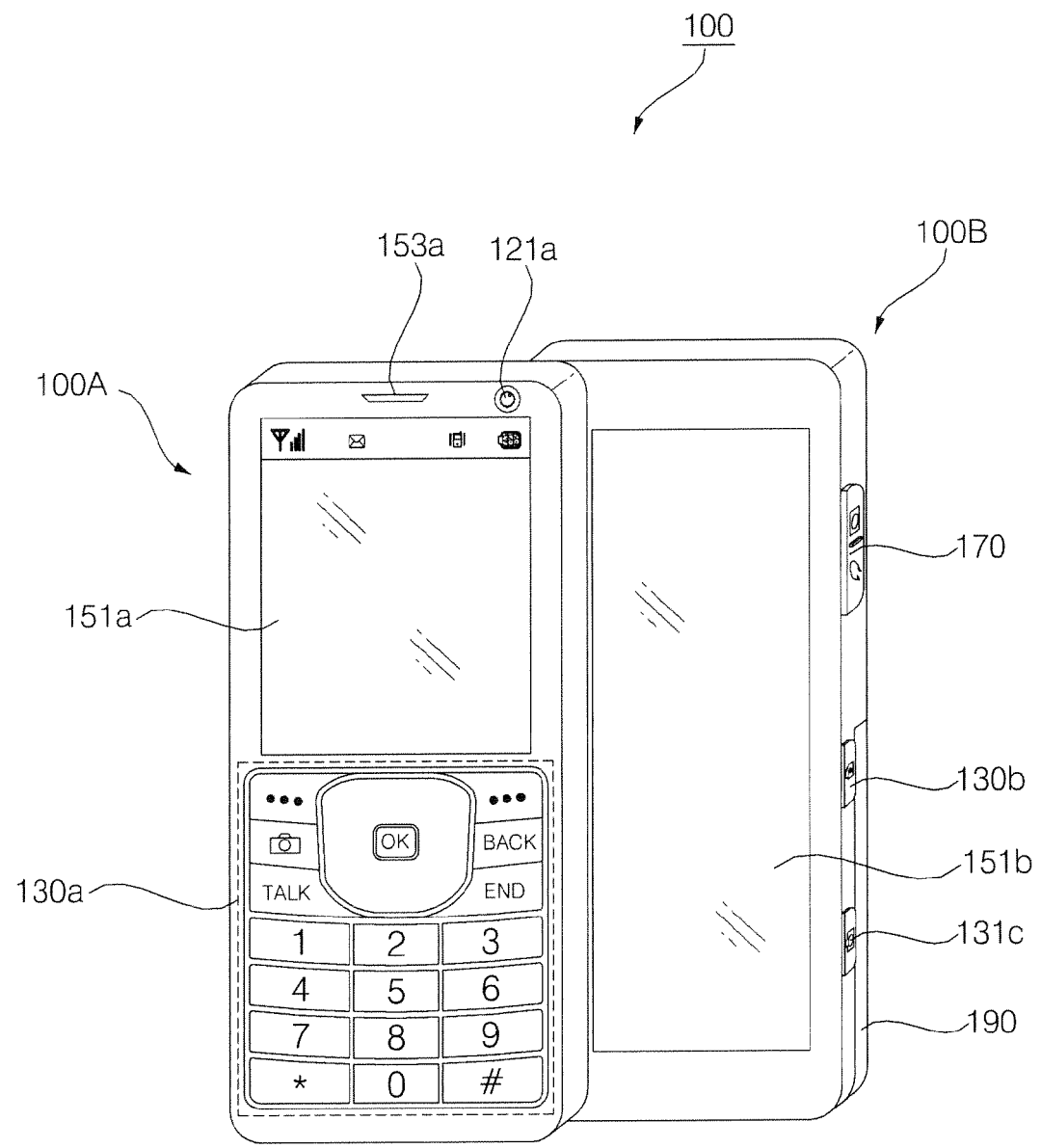
FIG. 2 is a front perspective view of the mobile terminal in accordance with an embodiment of the present invention.

FIG. 2 is a front perspective view of the mobile terminal in accordance with an embodiment of the present invention. Referring to FIG. 2, the mobile terminal of the present embodiment includes a first body 100A, and a second body 100B configured in the first body 100A in such a way as to slide in at least one direction.

A state where the first body 100A is overlapped with the second body 100B may be called a closed configuration, and a state where at least part of the second body 100B is exposed through the first body 100A as shown in FIG. 2 may be called an open configuration.

In the closed configuration of the mobile terminal 100, the mobile terminal 100 generally operates in a standby mode, but the standby mode can be released through a user's manipulation. In the open configuration of the mobile terminal 100, the mobile terminal 100 generally operates in a call mode, etc., but the call mode can be switched to the standby mode through a user's manipulation or after a lapse of a certain time period.

At least one intermediate casing may be disposed between the first body 100A and the second body 100B. Casings, forming the external appearance of the first body 100A and the second body 100B, and the intermediate casings may be formed by injecting synthetic resin or may be formed of metal material, for example, stainless steel (STS) or titanium (Ti).

A first display unit 151a, a first sound output module 153a, a first camera 121a, and a first user input unit 130a can be disposed in the first body 100A.

The first display unit 151a and a second display unit 151b to be described later on include a liquid crystal display (LCD), an organic light-emitting diode (OLED) or the like, which visually displays information. The first and second display units 151a and 151b have their touch pads overlapped in a layer structure, so that the first and second display units 151a and 151b can operate as a touch screen to thereby enable the input of information by a user's touch.

The first sound output module 153a can be implemented using a receiver or speaker. The first camera 121a can be implemented to capture still images or motion images of a user and so on.

The second display unit 151b can be disposed on the front face of the second body 100B. Second and third user input units 130b and 130c, the microphone 123, and the interface unit 170 can be disposed on the side of the second body 100B.

The microphone 123 can be implemented in an adequate fashion, which is suitable to receive a user's voice, other sound and so on. The interface unit 170 becomes a passage in which the mobile terminal according to the present invention can exchange data with external devices. For example, the interface unit 170 can be at least one of a connector for connecting to an earphone in a wired or wireless manner, a port for local area communication, and a power supply terminal for supplying power source to the mobile terminal 100. The interface unit 170 may be a card socket for accommodating SIM, UIM and external cards such as a memory card for information storage.

Figure 3:
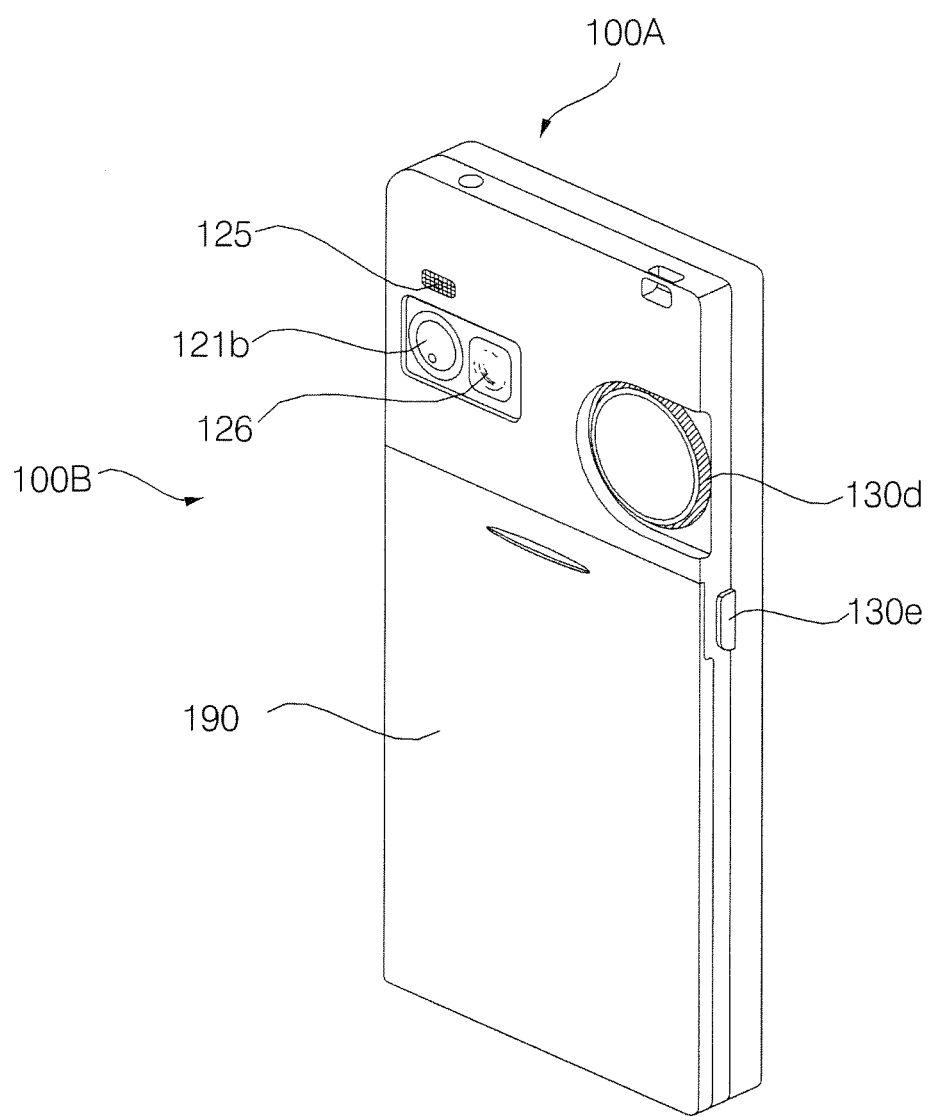
FIG. 3 is a rear perspective view of the mobile terminal in accordance with an embodiment of the present invention.

FIG. 3 is a rear perspective view of the mobile terminal shown in FIG. 2. Referring to FIG. 3, a fourth user input unit 130d of a wheel type and a second camera 121b can be further disposed on a rear face of the second body 100B. A fifth user input unit 130e can be disposed on the side of the second body 100B.

The first to fifth user input units 130a, 130b, 130c, 130d, and 130e can be collectively called the user input unit 130 and can adopt any kind of a method as long as it is a tactile manner, which allows a user to manipulate the user input unit 130 while feeling a tactile sense.

For example, the user input unit 130 can be implemented using a dome switch or a touch pad, which is able to receive commands or information through a user's push or touch manipulation, or can be implemented in a wheel or jog method in which a key is rotated or a manner using the joystick.

From a viewpoint of the function, the user input unit 130 is configured to input commands such as start, end, and scrolling, numbers or text, symbols and so on. The second to fifth user input units 130b, 130c, 130d, and 130e can operate as hot keys for activating special functions within the mobile terminal 100.

The second camera 121b has a photographing direction, which is substantially opposite to that of the first camera 121a, and can have different pixels from that of the first camera 121a. For example, the first camera 121a can have low pixels sufficiently enough to photograph a user's face and send the photographed face to a counterpart in the event of video telephony or the like. The second camera 121b can have high pixels because photographed subjects are generally not sent immediately.

A flash 125 and a mirror 126 can be further disposed adjacent to the second camera 121b. The flash 125 illuminates light to a subject when the subject is photographed using the second camera 121b. The mirror 126 allows a user to reflect his face when the user has himself photographed (self-photographing) using the second camera 121b.

A second sound output module (not shown) may be further disposed in the second body 100B. The second sound output module can realize a stereo function together with the first sound output module 153a and may also be used for a call in a speakerphone mode.

An antenna for a call, etc. and an antenna (not shown) for receiving broadcasting signals can be disposed on one side of the second body 100B. The antenna can be drawn out from the second body 100B. One part of a sliding module, which slidingly couples the first body 100A and the second body 100B, can be disposed on a rear casing of the first body 100A. The other part of the sliding module can be disposed on a front casing of the second body 100B in such a manner that it is not exposed to the outside.

It has been described above that the second camera 121b and the like are disposed in the second body 100B. However, the present invention is not necessarily limited to the above arrangement. For example, one or more of the constituent elements such as the second camera 121b, which have been described to be disposed in the second body 100B, may be disposed in the first body 100A. In this case, there is an advantage in that, in the closed configuration, the constituent elements disposed in the first body 100A are protected by the second body 100B. Further, although the second camera 121b is not separately provided, the first camera 121*a* may be rotatably formed in such a way as to photograph even photographing directions of the second camera 121*b*.

The power supply unit 190 for supplying power source to the mobile terminal is disposed in the second body 100B. The power supply unit 190 is, for example, a rechargeable battery, and can be detachably coupled to the second body 100B for the purpose of recharging, etc.

Figure 4:
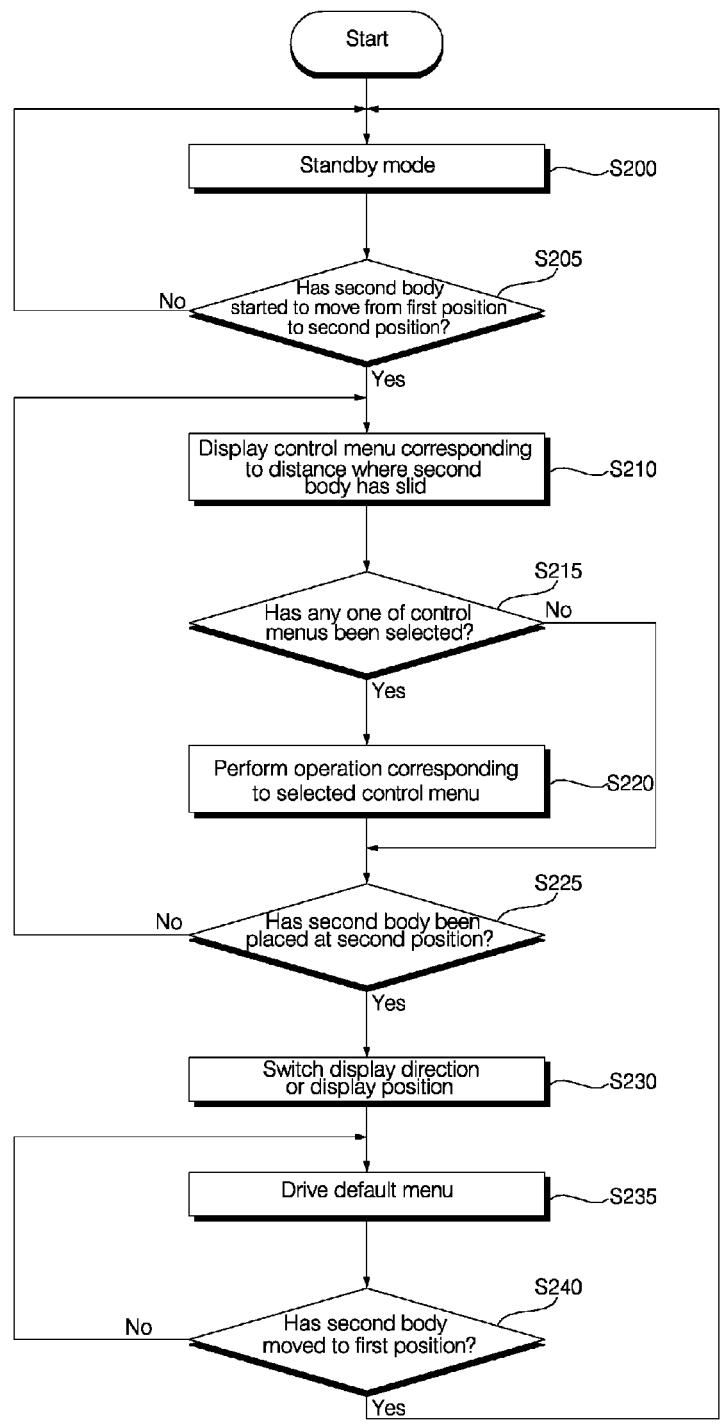
FIG. 4 is a flowchart illustrating a method of controlling the mobile terminal in accordance with an embodiment of the present invention.

FIG. 4 is a flowchart illustrating a method of controlling the mobile terminal in accordance with an embodiment of the present invention. Referring to FIG. 4, in a standby mode state (S200), the controller 180 determines whether the second body 100B starts to move from a first position to a second position (S205). Here, the first position refers to the closed configuration in which the first body 100A overlaps with the second body 100B (that is, that the second body 100B is in a slide-down position). The second position refers to a full open configuration in which the second body 100B slides and is fully exposed from the first body 100A (that is, that the second body 100B is in a slide-up state).

In the standby mode state, the first display unit 151*a* displays a default idle screen, but can be in a screen-off state after a lapse of a certain time period for the purpose of power saving, etc. In the case in which a key entry is performed through the user input unit 130 or the second body 100B slides, the first display unit 151*a* can be in a screen-on state again and displays the idle screen.

If, as a result of the determination in step S205, the second body 100B has started to move to the second position, the controller 180 displays a control menu, corresponding to a distance where the second body 100B has slid, on the second display unit 151*b* (S210). In other words, when the second body 100B starts to slide, the control menu is displayed on the second display unit 151*b*, and at least one of the type, configuration, and display of the control menu displayed on the second display unit 151*b* is changed according to a distance where the second body 100B has slid from the first position.

The controller 180 can determine a sliding distance of the second body 100B based on a sensing signal received from the sensing unit 140.

When the second body 100B slides and any one of the control menu displayed on the second display unit 151*b* is selected through a touch input, etc. (S215), the controller 180 controls an operation, corresponding to the selected control menu, to be executed (S220).

When the second body 100B continues to slide and reaches the second position (S225), the controller 180 controls the display direction of a screen, which is displayed on the second display unit 151*b*, to be switched or the display position of a screen, which is displayed on the second display unit 151*b*, to be switched from the first display unit 151*a* to the second display unit 151*b* according to a menu or application, which is driven according to a selected control menu (S230). Further, when there is a default menu, the controller 180 can control the default menu to be driven according to a user command or the like (S235).

If it is determined that the second body 100B returns back to the first position (S240), the controller 180 controls the first body 100A to enter the standby mode (S240). An operation corresponding to a user command, which is input in the state where the second body 100B is in the open configuration, may be performed, if appropriate. Alternatively, in the case in which the second body 100B returns back to the first position, the supply of power source to the second display unit 151*b* may be stopped.

Figure 5:
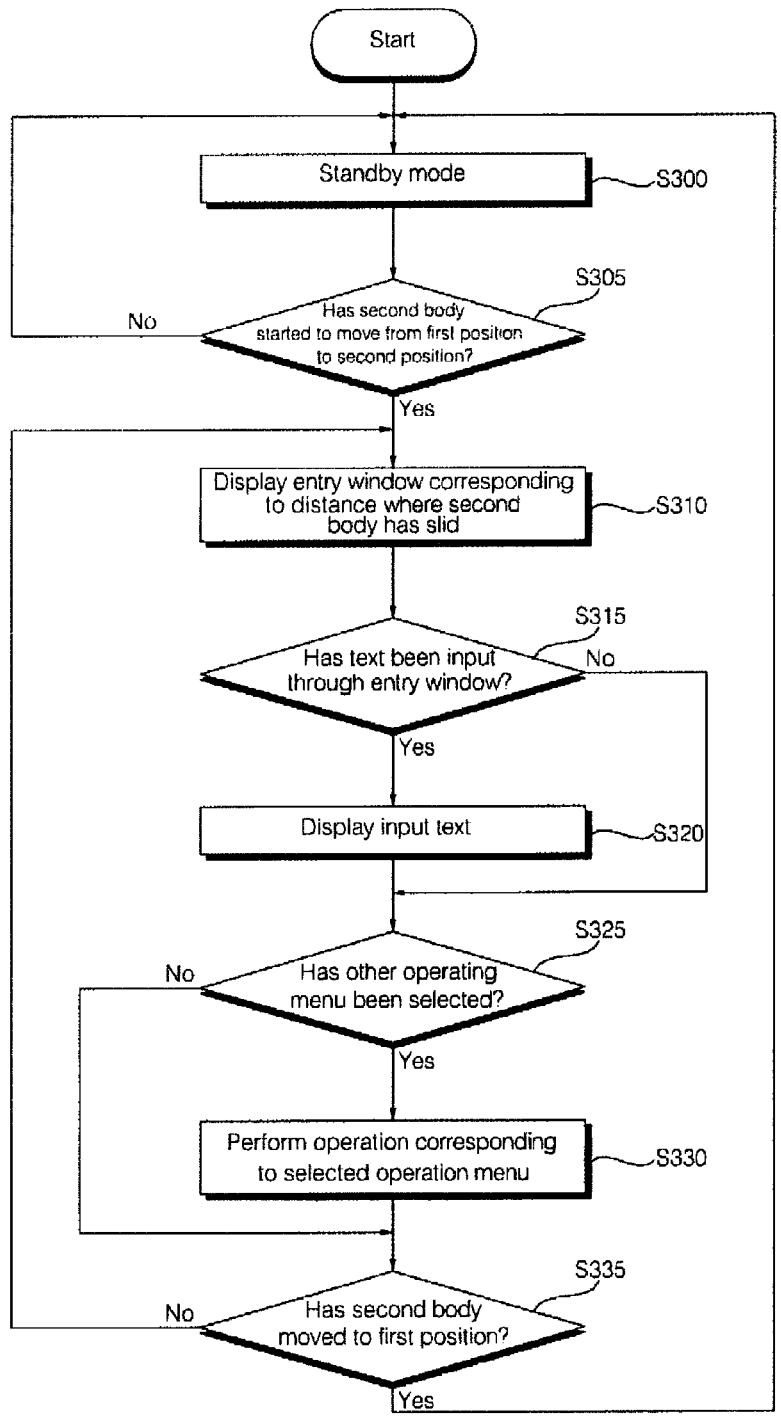
FIG. 5 is a flowchart illustrating a method of controlling the mobile terminal in accordance with another embodiment of the present invention.

FIG. 5 is a flowchart illustrating a method of controlling the mobile terminal in accordance with another embodiment of the present invention. Referring to FIG. 5, in a standby mode state (S300), the controller 180 determines whether the second body 100B has started to move from a first position (that is, a slide-down position where the second body 100B overlaps with the first body 100A) to a second position (that is, a slide-up position where the second body 100B is fully exposed from the first body 100A) (S305). If, as a result of the determination in step S305, the second body 100B has started to move to the second position, the controller 180 controls an entry window, corresponding to a distance where the second body 100B has slid, to be displayed on the second display unit 151*b* (S310). Here, the entry window can be any one of a keypad entry window, a writing recognition entry window, a selection type entry window, and a QWERTY input window. A user can input characters, such as numerals, the Korean alphabet, the alphabet, and a punctuation mark, other user-selected items and so on by a touch input through the entry window.

If it is determined that a character has been input through a displayed entry window (S315), the controller 180 controls the character, which has been input through the entry window, to be displayed on one area of the first display unit 151*a* or the second display unit 151*b* (S320). However, a character input through the entry window may not be displayed, but instead other operations may be performed, if appropriate.

If it is determined that other operation menu has been selected (S325), the controller 180 controls an operation, corresponding to the selected operation menu, to be execute (S330). The controller 180 controls the processes subsequent to the step (S310) to be executed repeatedly until the second body 100B returns back to the first position. When the second body 100B returns back to the first position (S335), the controller 180 controls the mobile terminal 100 to enter the standby mode.

Through this operation, an entry window corresponding to a distance where the second body 100B slides can be displayed.

Figure 6A:
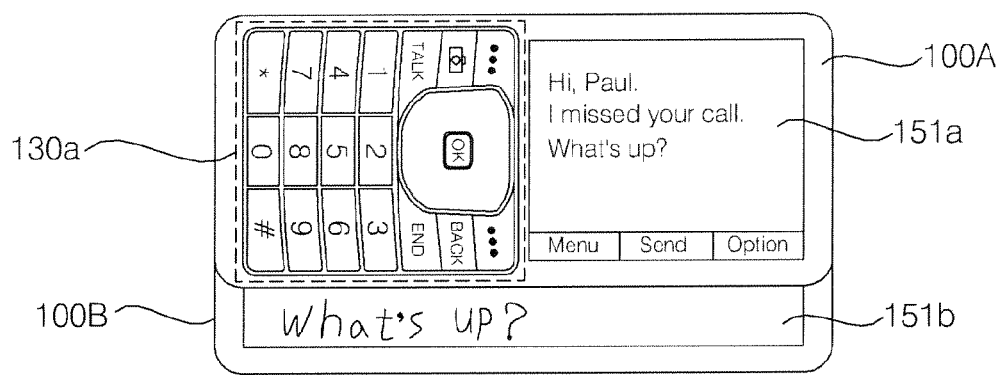
FIGS. 6a to 6c are views to which reference is made in order to describe the method of controlling the mobile terminal in accordance with the present invention in a text entry mode.
Figure 6B:
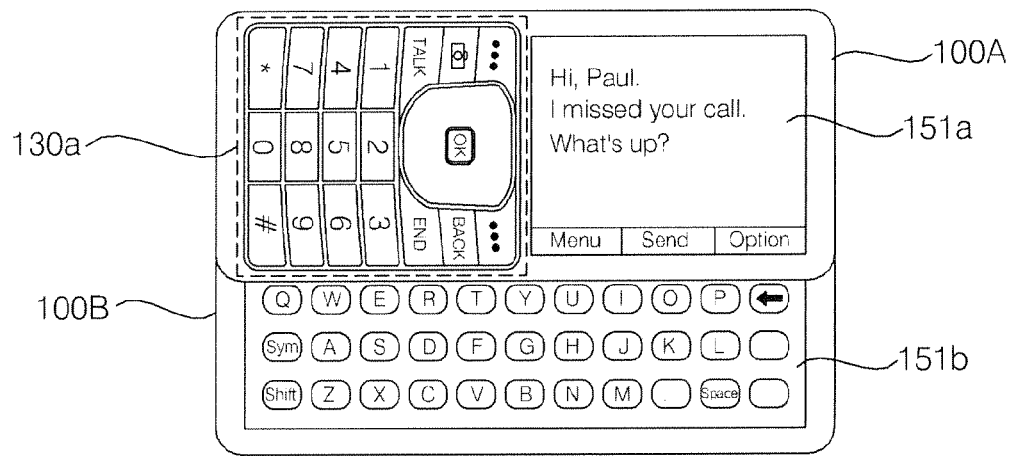
Figure 6C:
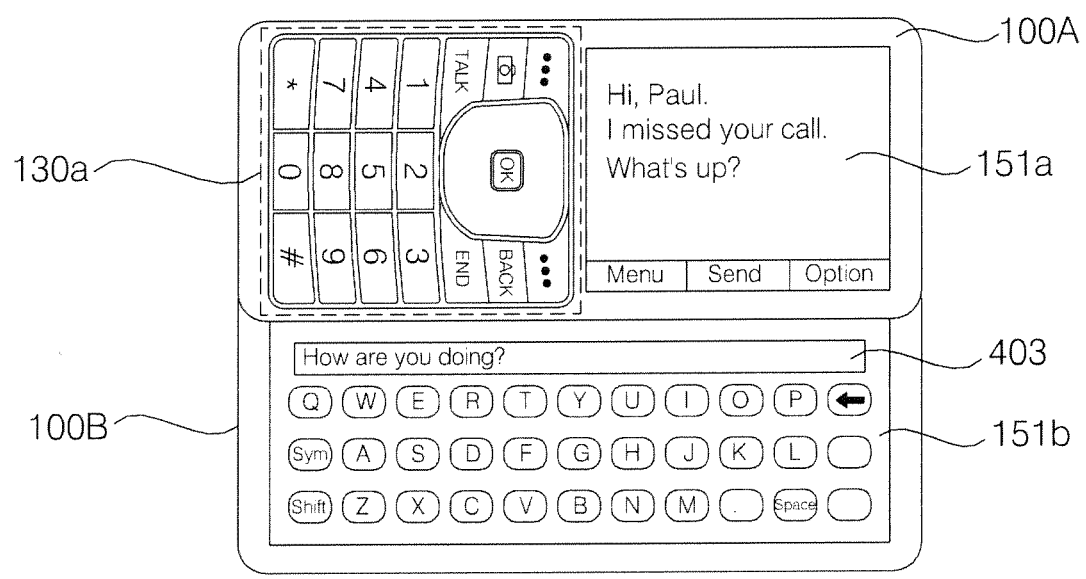

FIGS. 6A to 6C are views to which reference is made in order to describe the method of controlling the mobile terminal in accordance with the present invention together with a screen displayed on the display unit. FIGS. 6A to 6C are views to which reference is made in order to describe the method of controlling the mobile terminal in accordance with the present invention in a text entry mode.

Referring to FIG. 6A, in the case in which, in the text entry mode such as e-mail, text edition, etc., the second body 100B slides and thus partially becomes the open configuration, the second display unit 151*b* can be used as a writing recognition entry window. Text input through the second display unit 151*b* can be displayed on the first display unit 151*a*.

In this state, when the second body 100B further slides, the QWERTY input window is displayed on the second display unit 151*b* as shown in FIG. 6B. Text input through the QWERTY input window can also be displayed on the first display unit 151*a*. When the second body 100B continues to slide and fully becomes the open configuration, an entry display window 403 on which text, which is currently input through the QWERTY input window, is displayed is displayed on the second display unit 151*b* together with the QWERTY input window, as shown in FIG. 6C.

As described above, in the text entry mode, in the state where the second body 100B overlaps with the first body 100A and slides down, input text is received through the first user input unit 130*a*. When the second body 100B slides, an entry window corresponding to the second display unit 151*b* can be displayed according to a slid distance. Further, in the state where the second body 100B is slid down, a direction displayed on the first display unit 150a can be a direction vertical to a length direction of the first body 100A in order to facilitate the input of sentences through the first user input unit 130. After the second body 100B slides, a direction displayed on the first display unit 151a can be a length direction of the first body 100A in order to facilitate the input of text through the entry window displayed on the second display unit 151b.

Figure 7A:
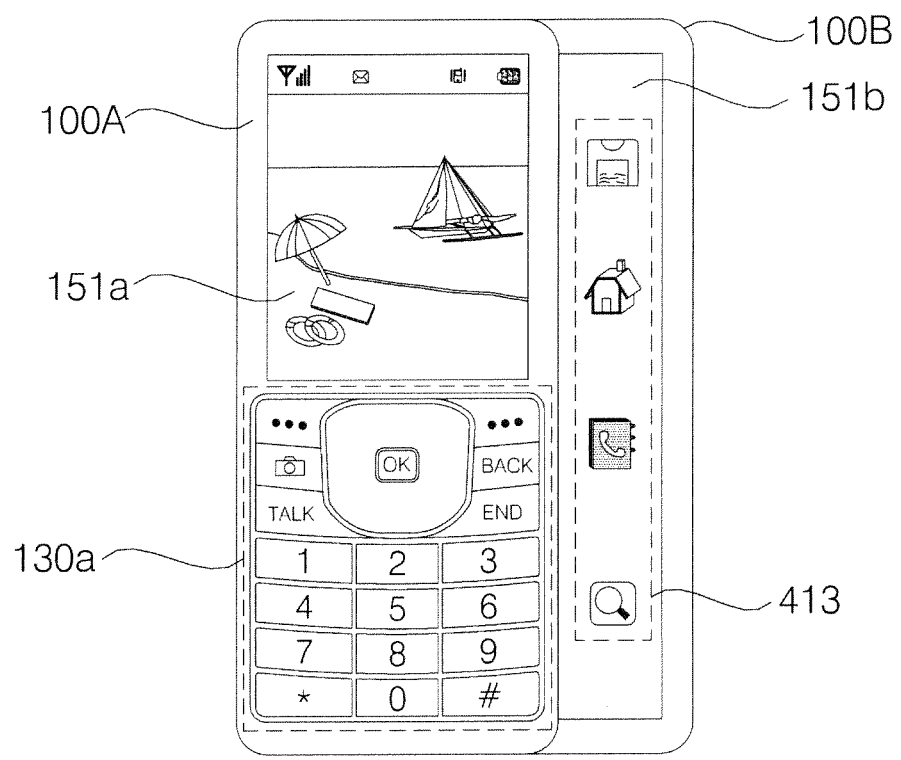
FIGS. 7a to 7c are views to which reference is made in order to describe the method of controlling the mobile terminal in accordance with the present invention in a menu display mode.
Figure 7B:
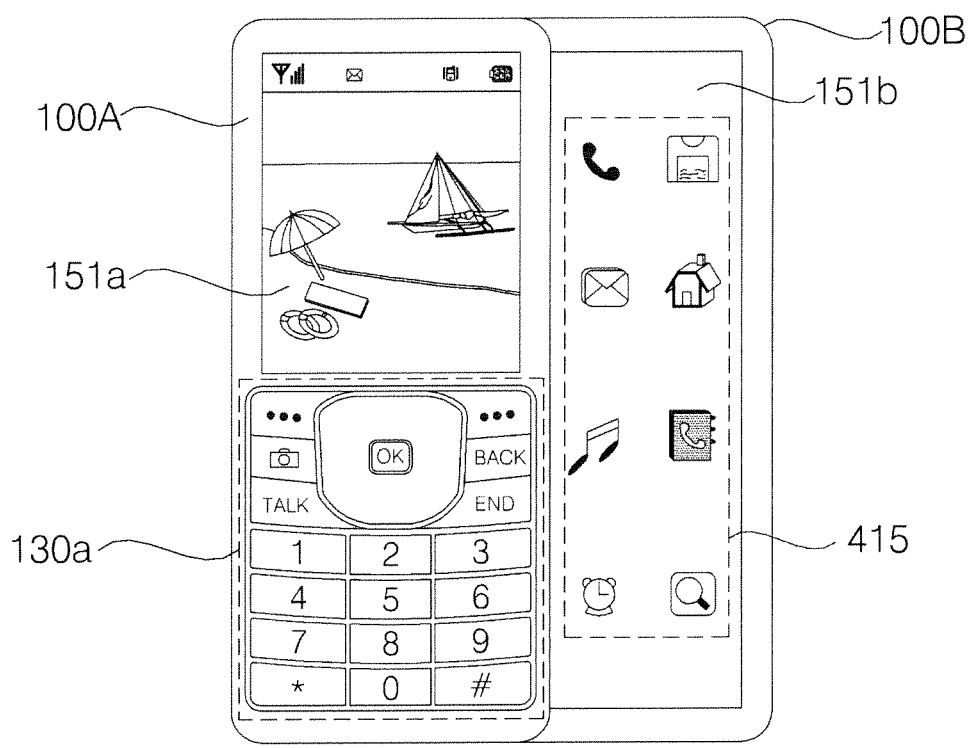
Figure 7C:
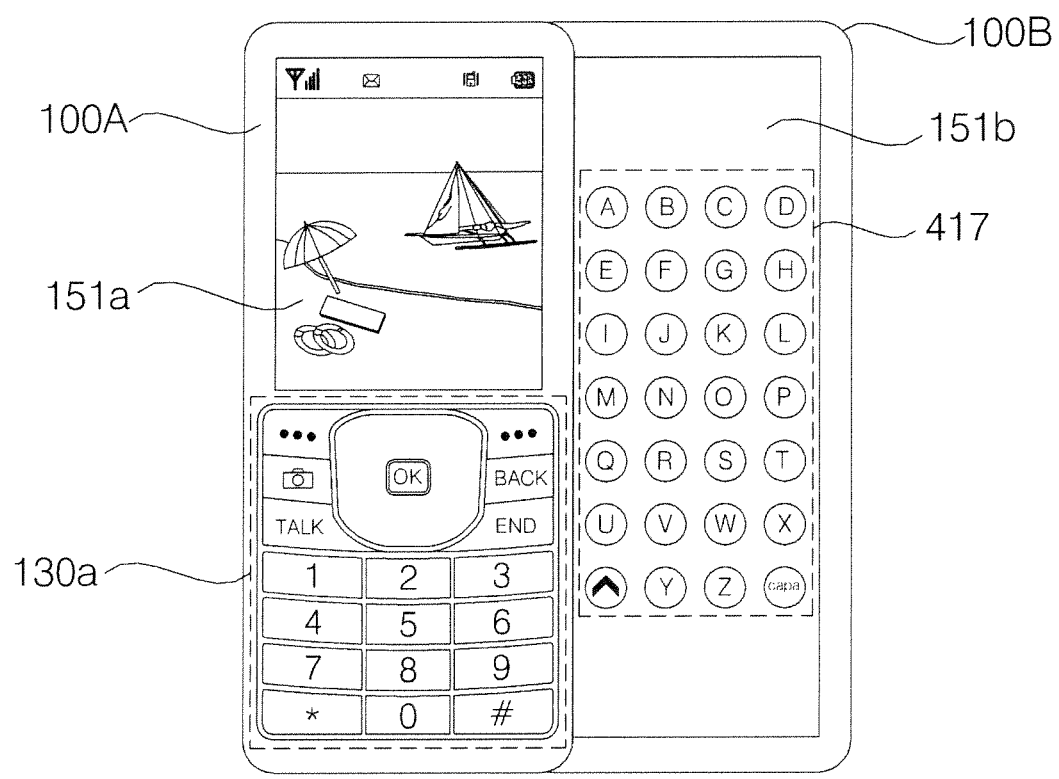

FIGS. 7A to 7C are views to which reference is made in order to describe the method of controlling the mobile terminal in accordance with the present invention in a menu display mode.

Referring to FIG. 7A, when the second body 100B slides from the first body 100A and partially becomes the open configuration, a first menu icon group 413 is displayed on the second display unit 151b. In this state, when the second body 100B further slides, a second menu icon group 415 is displayed on the second display unit 151b as shown in FIG. 7B. The second menu icon group 415 can display more menu icons than the first menu icon group 413. Menu icons included in the first and second menu icon groups 413 and 415 can be configured so that they can be selected by a user.

When the second body 100B fully becomes the open configuration, an alphabet keypad 417 instead of the second menu icon group 415 is displayed on the second display unit 151b. A user can execute a desired operation or menu by inputting the alphabet through the alphabet keypad 417.

Figure 8A:
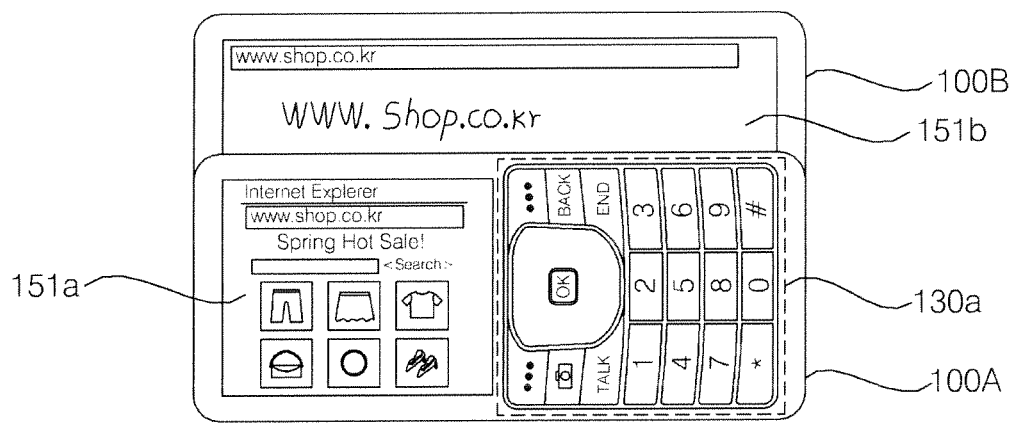
FIGS. 8a and 8b are views to which reference is made in order to describe the method of controlling the mobile terminal in accordance with the present invention in an Internet browsing mode.
Figure 8B:
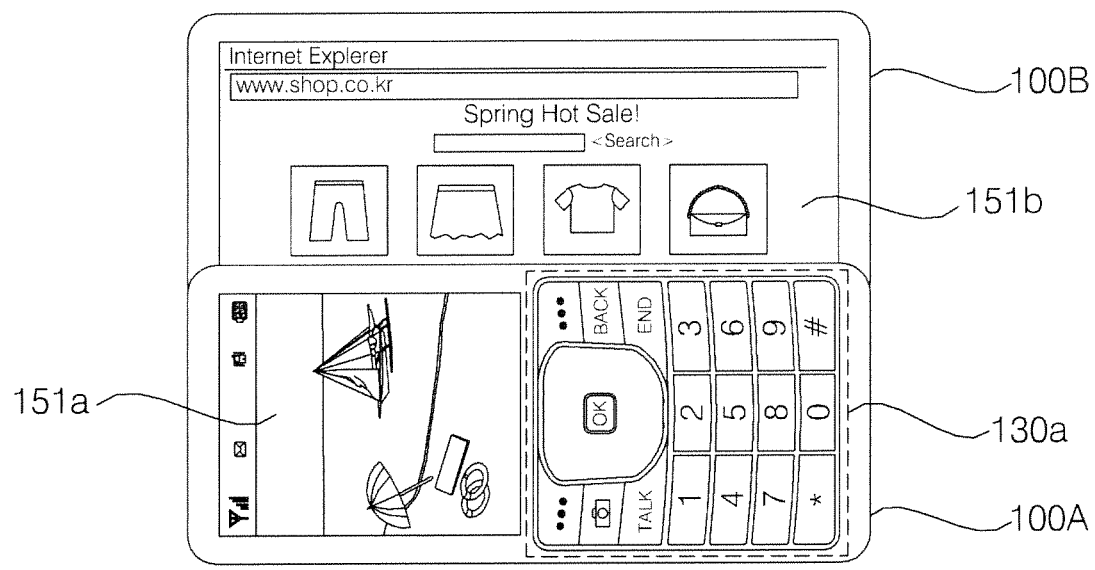

FIGS. 8A and 8B are views to which reference is made in order to describe the method of controlling the mobile terminal in accordance with the present invention in an Internet browsing mode.

Referring to FIG. 8A, in an Internet browsing mode, a webpage screen provided by an accessed website is displayed on the first display unit 151a. Here, when the second body 100B slides and partially becomes the open configuration, an entry window for inputting a webpage address is displayed on the second display unit 151b. In this state, when the second body 100B fully becomes the open configuration, a webpage screen is displayed on the second display unit 151b, and an idle screen or other default screen can be displayed on the first display unit 151a. The webpage screen displayed on the second display unit 151b can be scrolled using a touch input or a drag input.

Figure 9A:
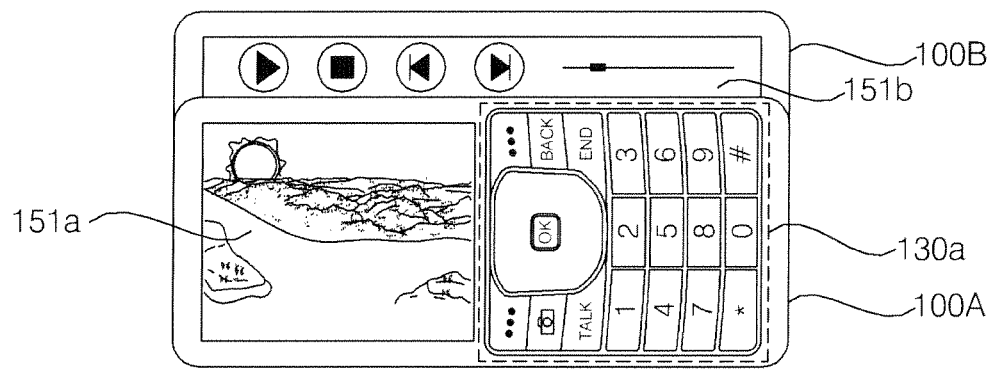
FIGS. 9a to 9c are views to which reference is made in order to describe the method of controlling the mobile terminal in accordance with the present invention in a multimedia play mode.
Figure 9B:
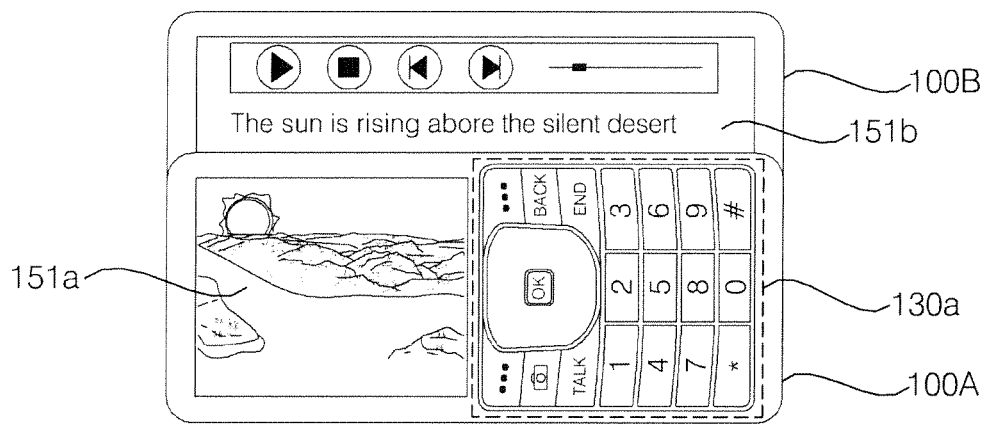
Figure 9C:
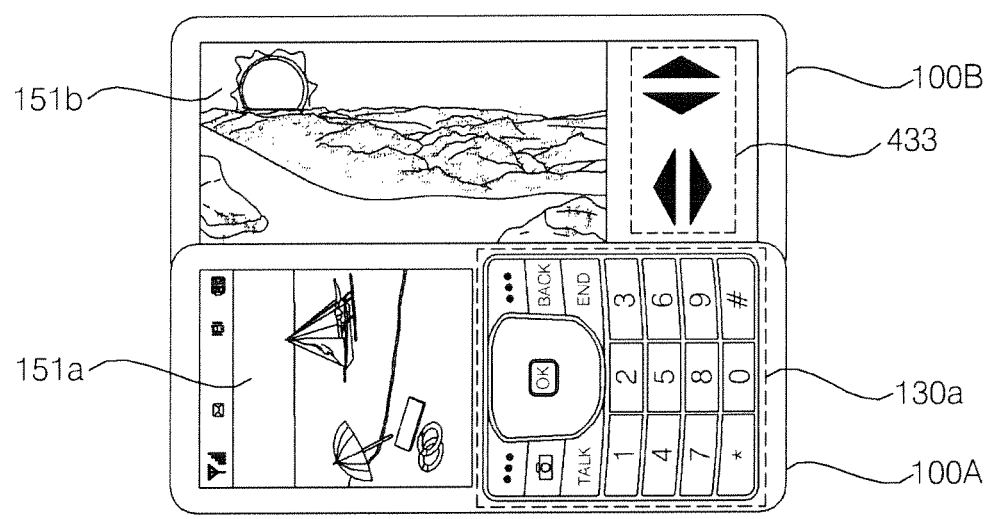

FIGS. 9A to 9C are views to which reference is made in order to describe the method of controlling the mobile terminal in accordance with the present invention in a multimedia play mode. In the state where a motion image screen is displayed on the first display unit 151a, when the second body 100B slides and partially becomes the open configuration, icons for controlling the play of the motion image are displayed on the second display unit 151b, as shown in FIG. 9A. In this state, when the second body 100B further slides, a caption can be displayed on the second display unit 151b along with the icons for control, as shown in FIG. 9B. When the second body 100B slides and is fully opened, a motion image screen and icons 433 for controlling the motion image are displayed on the second display unit 151b, as shown in FIG. 9C.

Figure 10A:
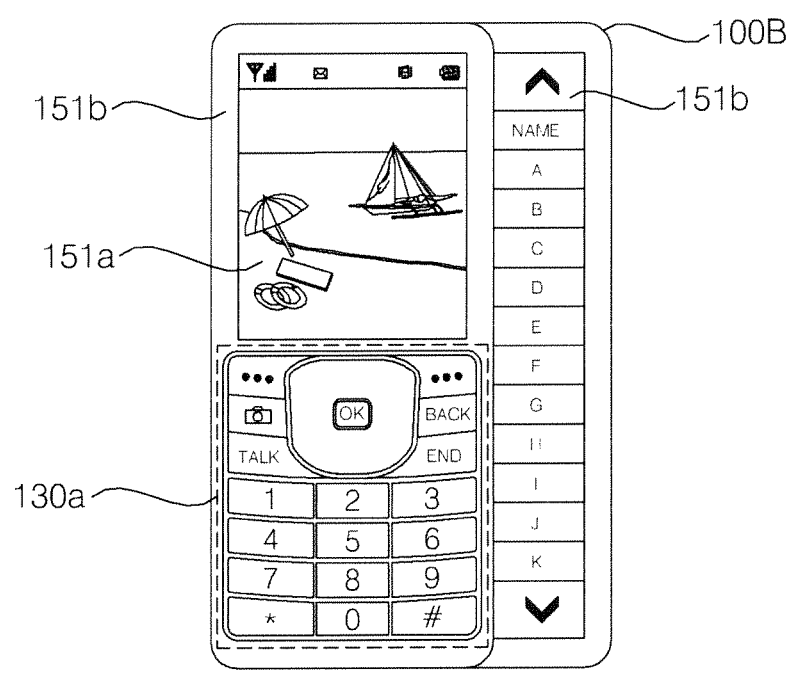
FIGS. 10a and 10b are views to which reference is made in order to describe the method of controlling the mobile terminal in accordance with the present invention in a call mode.
Figure 10B:
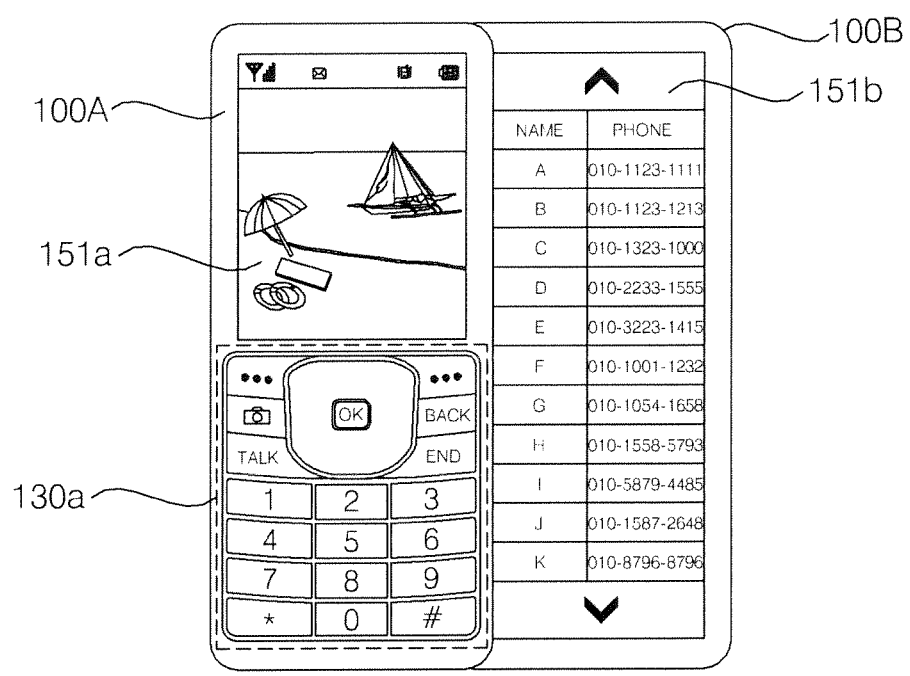

FIGS. 10A and 10B are views to which reference is made in order to describe the method of controlling the mobile terminal in accordance with the present invention in a call mode.

Referring to FIG. 10A, in the call mode, when the second body 100B slides, a call record can be displayed on the second body display unit 151b. Here, in the call record, counterpart names can be displayed in order of the recent calls or the most frequent calls. A call can be made by selecting any one of the call list displayed on the second display unit 151b. When the second body 100B continues to slide, a call record in which both counterpart names and telephone numbers are displayed is displayed on the second display unit 151b, as shown in FIG. 10B. As described above, while an item is changed according to a distance where the second body 100B slides, a call record can be displayed.

Further, the mobile terminal and the method of controlling the same in accordance with the present invention are not limited to the constructions and methods described in connection with the above embodiments, but the embodiments may be selectively combined and configured partially or entirely so that they can be modified in various manners.

Meanwhile, the present invention can be implemented as a code readable by a processor included in a mobile terminal, such as a mobile station modem (MSM), in the processor-readable recording medium. The processor-readable recording medium can include all kinds of recording devices in which data readable by the processor is stored. For example, the processor-readable recording medium can include ROM, RAM. CD-ROM, magnetic tapes, floppy disks, optical data storages and so on, and can also be implemented in the form of carrier waves, such as transmission over the Internet. Further, the processor-readable recording medium can be distributed into computer systems connected over a network, so codes readable by a processor can be stored and executed in a distributed manner.

As described above, in accordance with the present invention, a touch screen is provided in the second body that is coupled to the first body in a sliding manner. Thus, in the slide-down state of the second body, the touch screen can be protected by the first body. Further, a control menu, an entry window and so on can be displayed on the touch screen, which is provided in the second body, according to a distance where the second body slides. Accordingly, various operations can be controlled conveniently in a mobile terminal using the touch screen that is protected when it is not used.

While the invention has been shown and described with respect to the preferred embodiments, it will be understood by those skilled in the art that various changes and modifications may be made without departing from the spirit and scope of the invention as defined in the following claims.

What is claimed is:

1. A mobile terminal, comprising:
a first body equipped with a first display screen;
a second body equipped with a second display screen and slidably coupled to the first body such that the second display screen is not exposed when the mobile terminal is in a closed configuration and is fully exposed when the mobile terminal is in a fully open configuration in which the second body is fully slid away from the first body;
a sensing unit configured to sense a sliding distance when the second body is slid away from the first body; and
a controller configured to:
cause displaying of first information on the first display screen;
cause displaying of a control menu on the second display screen when the second body is partially slid away from the first body while the first information is displayed on the first display screen;
control the display of the first information on the first display screen in response to selection of a menu item from the control menu displayed on the second display screen; and
stop displaying the first information on the first display screen and display the first information on the second display screen when the second body is fully slid away from the first body while the first information is displayed on the first display screen.

2. The mobile terminal of claim 1, wherein at least the first display screen or the second display screen includes a touch screen.

3. The mobile terminal of claim 1, wherein the first information comprises multimedia.

4. The mobile terminal of claim 1, wherein the controller is further configured to cause displaying of second information on the second display screen in addition to the first information when the mobile terminal is in the fully open configuration.

5. The mobile terminal of claim 4, wherein the second information comprises a control menu for controlling the display of the first information on the second display screen.

6. The mobile terminal of claim 1, wherein the controller is further configured to:
cause displaying of second information on the first display screen;
when the mobile terminal is in the fully open configuration and the first information is displayed on the second display screen-based.

7. The mobile terminal of claim 1, wherein the controller is further configured to cause:
displaying of a first type of control menu on the second display screen when a first sliding distance is sensed by the sensing unit; and
displaying of a second type of control menu on the second display screen when a second sliding distance is sensed by the sensing unit.

8. The mobile terminal of claim 1, wherein the control menu is at least partially displayed on the second display screen when the second body starts to slide with respect to the first body.

9. A method of controlling a mobile terminal, including a first body equipped with a first display screen, and a second body equipped with a second display screen and slidably coupled to the first body, the method comprising:
allowing the second body to slide with respect to the first body such that the second display screen is not exposed when the mobile terminal is in a closed configuration and is fully exposed when the mobile terminal is in a fully open configuration in which the second body is fully slid away from the first body;
displaying first information on the first display screen;
sensing a sliding distance when the second body is slid away from the first body while the first information is displayed on the first display screen;
displaying a control menu on the second display screen based on the sensed sliding distance, the control menu for controlling the display of the first information on the first display screen;
controlling the display of the first information on the first display screen in response to selection of a menu item from the control menu displayed on the second display screen; and
stopping the display of the first information on the first display screen and displaying the first information on the second display screen when the second body is fully slid away from the first body while the first information is displayed on the first display screen.

10. The method of claim 9, wherein at least the first display screen or the second display screen includes a touch screen.

11. The method of claim 9, wherein the first information comprises multimedia.

12. The method of claim 9, further comprising displaying second information on the second display screen in addition to the first information when the mobile terminal is in the fully open configuration.

13. The method of claim 12, wherein the second information comprises a control menu for controlling the display of the first information on the second display screen.

14. The method of claim 9, wherein the second display screen comprises a touch screen configured to receive a touch input for selecting the menu item from the control menu.

15. The method of claim 9, further comprising displaying second information on the first display screen when the mobile terminal is in the fully open configuration and the first information is displayed on the second display screen.

16. The method of claim 9, further comprising:
displaying a first type of control menu on the second display screen when a first sliding distance is sensed; and
displaying a second type of control menu on the second display screen when a second sliding distance is sensed.

17. A mobile terminal, comprising:
a first body equipped with a first display screen;
a second body equipped with a touch screen and slidably coupled to the first body such that the touch screen is not exposed when the mobile terminal is in a closed configuration and is fully exposed when the mobile terminal is in a fully open configuration in which the second body is fully slid away from the first body;
a sensing unit configured to sense a sliding distance when the second body is slid with respect to the first body; and
a controller configured to:
cause displaying of an entry window on the touch screen based on the sensed sliding distance, wherein a type of the displayed entry window varies according to the sensed sliding distance such that a first type of entry window is displayed when a first sliding distance is sensed, a second type of entry window is displayed when a second sliding distance is sensed, and a third type of entry window is displayed when a third sliding distance is sensed in which the second body is fully slid away from the first body; and
cause displaying of text input via the entry window on the first display screen,
wherein:
the first type of entry window is a handwriting recognition input window;
the second type of entry window is a QWERTY key input window; and
the third type of entry window is a QWERTY key input window having an entry display window.

18. The mobile terminal of claim 17, wherein the second and third sliding distances are distances where more than a half of the touch screen is exposed by sliding the second body with respect to the first body.

19. A method of controlling a mobile terminal, including a first body equipped with a display screen and a second body equipped with a touch screen and slidably coupled to the first body, the method comprising:
allowing the second body to slide with respect to the first body such that the touch screen is not exposed when the mobile terminal is in a closed configuration and is fully exposed when the mobile terminal is in a fully open configuration in which the second body is fully slid away from the first body;
sensing a sliding distance when the second body is slid with respect to the first body;
displaying an entry window on the touch screen based on the sensed sliding distance, wherein a type of the displayed entry window varies according to the sensed sliding distance such that a first type of entry window is displayed when a first sliding distance is sensed, a second type of entry window is displayed when a second sliding distance is sensed, and a third type of entry window is displayed when a third sliding distance is sensed in which the second body is fully slid away from the first body; and displaying text input via the touch screen on the first display screen, wherein:

the first type of entry window is a handwriting recognition input window;

the second type of entry window is a QWERTY key input window; and the third type of entry window is a QWERTY key input window having an entry display window.

20. The method of claim 19, wherein the second and third sliding distances are distances where more than a half of the touch screen is exposed by sliding the second body with respect to the first body.

* * * * *